US005822560A

United States Patent [19]
Pflum

[11] Patent Number: 5,822,560
[45] Date of Patent: Oct. 13, 1998

[54] APPARATUS FOR EFFICIENT INSTRUCTION EXECUTION VIA VARIABLE ISSUE AND VARIABLE CONTROL VECTORS PER ISSUE

[75] Inventor: Marty L. Pflum, Austin, Tex.

[73] Assignee: Advanced Micro Devices, Inc., Sunnyvale, Calif.

[21] Appl. No.: 652,785

[22] Filed: May 23, 1996

[51] Int. Cl.$^6$ ...................................................... G06F 9/38
[52] U.S. Cl. .......................................... 395/390; 395/384
[58] Field of Search .................................... 395/380, 382, 395/384, 386, 387, 388, 389, 390, 391, 393, 394, 800

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 395/402 |
| 4,807,115 | 2/1989 | Torng | 395/391 |
| 4,858,105 | 8/1989 | Kuriyama et al. | 395/391 |
| 5,136,696 | 8/1992 | Beckwith et al. | 395/587 |
| 5,226,126 | 7/1993 | McFarland et al. | 395/394 |
| 5,226,130 | 7/1993 | Favor et al. | 395/585 |
| 5,355,457 | 10/1994 | Shebanow et al. | 395/394 |
| 5,438,668 | 8/1995 | Coon et al. | 395/380 |
| 5,490,280 | 2/1996 | Gupta et al. | 395/800.23 |
| 5,511,172 | 4/1996 | Kimura et al. | 395/582 |
| 5,598,546 | 1/1997 | Blomfren | 395/385 |
| 5,623,619 | 4/1997 | Witt | 711/3 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

"High Performance Dual Architecture Processor", IBM Technical Disclosure Bulletin, vol. 36, No. 36, No. 2, Feb. 1993.

Minagawa et al, "Pre–decoding Mechanism for Superscalar Architecture", IEEE Pacific Rim Conference on Computers, May 9–10, 1991, pp. 21–24.

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—Parshotam S. Lall
*Assistant Examiner*—Viet Vu
*Attorney, Agent, or Firm*—Conley, Rose & Tayon, PC; B. Noel Kivlin; Lawrence J. Merkel

[57] ABSTRACT

An apparatus employs a flexible instruction categorization scheme which includes three categories: single dispatch, multiple dispatch, and microcode. Single dispatch instructions are performed in one functional unit. Conversely, multiple dispatch instructions are conveyed to multiple functional units, each of which perform a portion of the multiple dispatch instruction. A predefined fixed number of functional units are employed to execute a multiple dispatch instruction, allowing for additional instructions to be dispatched concurrently with the multiple dispatch instructions. In contrast to multiple dispatch instructions, microcode instructions may occupy a variable number of functional units and may dispatch instructions for a variable number of clock cycles. Additionally, multiple instruction operations may be performed in a given functional unit in response to an instruction. In one embodiment, up to two instruction operations may be performed in a functional unit. The instruction operations corresponding to a particular instruction are stored as control vectors in a control vector storage within the corresponding functional unit.

22 Claims, 8 Drawing Sheets

APPARATUS FOR EFFICIENT INSTRUCTION EXECUTION VIA VARIABLE ISSUE AND VARIABLE CONTROL VECTORS PER ISSUE

BACKGROUND OF THE INVENTION

1. Field of the Invention

This invention is related to the field of microprocessors and, more particularly, to instruction issue and execution within microprocessors.

2. Description of the Relevant Art

Superscalar microprocessors achieve high performance by executing multiple instructions during a clock cycle and by specifying the shortest possible clock cycle consistent with the design. As used herein, the term "clock cycle" refers to an interval of time accorded to various stages of an instruction processing pipeline. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively.

Many superscalar microprocessor manufacturers design microprocessors in accordance with the x86 microprocessor architecture. Due to its wide acceptance in the computer industry, the x86 microprocessor architecture is employed by a large body of software. Microprocessors designed in accordance with the x86 microprocessor architecture advantageously enjoy compatibility with this large body of software. Computer systems manufacturers may be more inclined to choose an x86-compatible microprocessor than a non-x86-compatible microprocessor for computer systems. Information regarding the x86 microprocessor architecture may be found in the publication entitled: "PC Magazine Programmer's Technical Reference: The Processor and the CoProcessor" by Hummel, Ziff-Davis Press, Emeryville, Calif., 1992. This publication is incorporated herein by reference in its entirety.

The x86 microprocessor architecture is characterized by a plurality of complex variable byte length instructions. A particular instruction may comprise a single byte, or multiple bytes. Additionally, instructions may specify one or more instruction operations. As used herein, an "instruction operation" refers to an operation which may be performed by a functional unit to produce a result. Exemplary instruction operations may include an arithmetic operation, a logical operation, an address generation, etc. Instructions may have explicit instruction operations (i.e. operations defined by the opcode of the instruction) and implicit instruction operations defined by the particular instruction coded by the programmer (i.e. an address generation and a load or store operation for an operand stored in memory).

Unfortunately, complex instructions employing more than one instruction operation are often difficult to execute in superscalar microprocessors. Superscalar microprocessors typically employ multiple functional units to perform concurrent execution of instructions. Therefore, it is desirable that the functional units be relatively simple, such that each functional unit occupies a small amount of silicon area. For example, a functional unit may be configured to execute one instruction operation during a clock cycle. Complex instructions may utilize multiple clock cycles within such functional units, or may be dispatched to multiple functional units via a microcode unit. If the complex instruction is executed via multiple cycles in a functional unit, the complex instruction must be interpreted differently by the functional unit during each clock cycle to perform the instruction operations specified by that instruction. Complex logic may be employed to correctly execute these complex instructions, deleteriously enlarging the size of the functional unit. Conversely, if multiple functional units are utilized then multiple locations in a reorder buffer (which tracks instructions outstanding within the microprocessor) are typically occupied by the instruction. The number of instructions which may be concurrently outstanding within the microprocessor is thereby reduced by the number of extra storage locations occupied by the instruction. Performance of the microprocessor may be deleteriously affected.

The multiple functional units employed by a superscalar microprocessor may be equipped with reservation stations to store instructions and operands prior to their execution by the respective functional unit. Reservation stations are useful in a superscalar microprocessor because instructions may be decoded and dispatched prior to the source operands of the instruction being available. An "operand" or "operand value" of an instruction is a value the instruction is intended to operate upon. Operands may be located by an "operand address" which may define a register or a memory location storing the operand. Operands may be register operands in which the value is stored in a register, memory operands in which the value is stored in a memory location, or immediate operands in which the value is stored within the instruction itself. A source operand value is a value upon which the instruction operates, and a destination operand is a location to store the result of executing the instruction. A result is a value generated by operating upon the source operands according to the instruction operation(s) defined by the instruction.

Generally speaking, a reservation station comprises one or more storage locations (referred to as "reservation station entries"). Each reservation station entry may store a decoded instruction and operands or operand values. Other useful information may also be stored in a reservation station entry.

Typically, a decoded instruction is transferred to a storage device within a functional unit when the operand values have been provided. The decoded instruction is then decomposed into a plurality of control bits. The control bits are conveyed to the dataflow elements within the functional unit, and cause the dataflow elements to perform the instruction operation. A "dataflow element" is a device which performs a particular manipulation upon an input operand or operands according to a set of control bits conveyed thereto. For example, a multiplexor is a dataflow element which selects one of multiple input operands. The control bits provided to the multiplexor indicate which of the multiple input operands should be selected. As another example, an arithmetic unit is a dataflow element which may add or subtract input operands dependent upon the state of its input control bits. Unfortunately, decomposing a decoded instruction into control bits and then performing the instruction operation defined by the instruction during a clock cycle may limit the frequency (i.e. the inverse of the clock cycle) of a superscalar microprocessor.

SUMMARY OF THE INVENTION

The problems outlined above are in large part solved by an apparatus in accordance with the present invention. The apparatus employs a flexible instruction categorization scheme in order to efficiently perform instructions using an optimal amount of hardware. The instruction categorization scheme includes three categories: single dispatch, multiple dispatch, and microcode. Single dispatch instructions are performed in one functional unit. Conversely, multiple dispatch instructions are conveyed to multiple functional units, each of which perform a portion of the multiple dispatch instruction. A predefined fixed number of functional units are employed to execute a multiple dispatch instruction, allowing for additional instructions to be dispatched concurrently with the multiple dispatch instructions. In contrast to multiple dispatch instructions, microcode instructions may occupy a variable number of functional units and may dispatch instructions for a variable number of clock cycles.

Additionally, multiple instruction operations may be performed in a given functional unit in response to an instruction. In one embodiment, up to two instruction operations may be performed in a functional unit. In other words, a single dispatch instruction may comprise up to two instruction operations. For an embodiment in which multiple dispatch instructions comprise double dispatch instructions occupying two functional units, multiple dispatch instructions may include up to four instruction operations. The instruction operations corresponding to a particular instruction are stored as control vectors in a control vector storage within the corresponding functional unit.

The apparatus described herein enhances the performance of the microprocessor without introducing undue complication in the functional units included therein. Where conventional methods would categorize all instructions as either single dispatch or microcode, the apparatus allows for more flexibility by including a multiple dispatch instruction category. The flexibility may be used to significant advantage by the apparatus. For example, instruction throughput may be enhanced by dispatching single dispatch instructions concurrently with multiple dispatch instructions. Because the multiple dispatch instruction occupy a predefined fixed number of functional units, single dispatch instructions may be concurrently dispatched upon detection of the multiple dispatch instructions. Additionally, functional unit complexity may be reduced by placing more complex instructions into the multiple dispatch instruction category.

Having multiple control vectors per functional unit may also increase performance without undue complexity increase in the functional unit. Moderately complex instructions may be categorized as single dispatch by employing the multiple control vectors. Instructions which might otherwise be categorized as microcode instructions may be categorized as multiple dispatch by employing the multiple control vectors available in the multiple functional units. The variable dispatch, variable control vector protocol thereby allows considerable freedom in optimizing the complexity and performance of a microprocessor employing the apparatus. High operating frequencies may be enabled due to the simplification of hardware while maintaining instruction throughput at rates higher than a single dispatch/microcode approach may allow.

Broadly speaking, the present invention contemplates a method for efficient instruction execution in a microprocessor comprising several steps. An instruction is classified into one of at least three categories. The categories include a single dispatch category, a multiple dispatch category, and a microcode instruction category. The instruction is routed to a single issue position if the instruction is in the single dispatch category. The issue position executes the instruction via at least one control vector. Similarly, the instruction is routed to at least two issue positions if the instruction is in the multiple dispatch category. Each issue position executes a portion of the instruction via at least one control vector. The instruction is routed to a microcode unit if the instruction is in the microcode instruction category. The microcode unit is configured to decompose the instruction into a plurality of instructions within the single dispatch category. The plurality of instructions perform a plurality of operations corresponding to the instruction.

The present invention further contemplates an apparatus for efficient instruction execution, comprising a first issue position, a second issue position, a microcode unit, and an instruction scanning unit. The first issue position includes a first reservation station coupled to a first functional unit. Similarly, the second issue position includes a second reservation station coupled to a second functional unit. The microcode unit is configured to decompose an instruction into a plurality of instructions executable by the first and second issue positions. The instruction is in a multiple dispatch category if the plurality of instructions equals a predetermined fixed number of instructions. Alternatively, the instruction is in a microcode instruction category if the plurality of instructions is different in number than the predetermined fixed number of instructions. Coupled to the microcode unit and coupled to provide instructions to the first and second issue positions, the instruction scanning unit is configured to categorize the instruction as in one of a single dispatch category, the multiple dispatch category, and the microcode instruction category. Additionally, the instruction scanning unit is configured to route the instruction to the microcode unit if the instruction is in the microcode instruction category. Still further, the instruction scanning unit is configured to route the instruction to one of the first and second issue positions if the instruction is in the single dispatch category. The first and second issue positions execute the instruction as at least one control vector.

The present invention still further contemplates a microprocessor, comprising a first issue position, a second issue position, an instruction alignment unit, a microcode unit, and an instruction scanning unit. The first issue position includes a first decode unit coupled to a first reservation station The first reservation station is further coupled to a first functional unit within the first issue position. Similarly the second issue position includes a second decode unit coupled to a second reservation station. The second reservation station is further coupled to a second functional unit within the second issue position. The instruction alignment unit is configured to align instructions to the first and second issue positions coupled thereto. The microcode unit is configured to decompose an instruction into a plurality of instructions executable by the first and second issue positions. The instruction is in a multiple dispatch category if the plurality of instructions equals a predetermined fixed number of instructions. Conversely, the instruction is in a microcode instruction category if the plurality of instructions is different in number than the predetermined fixed number of instructions. Coupled to the microcode unit and the instruction alignment unit, the instruction scanning unit is configured to categorize the instruction as in one of a single dispatch category, the multiple dispatch category, and the microcode instruction category. Furthermore, the instruction scanning unit is configured to route the instruction to the microcode unit if the instruction is in the microcode instruction category. Still further, the instruction scanning unit is configured to route the instruction to the instruction alignment unit for alignment to one of the first and second issue positions if the instruction is in the single dispatch category. The first and second issue positions execute the instruction as at least one control vector.

BRIEF DESCRIPTION OF THE DRAWINGS

Other objects and advantages of the invention will become apparent upon reading the following detailed description and upon reference to the accompanying drawings in which:

FIG. 4 is a block diagram of one embodiment of a decode unit, a reservation station, and a functional unit shown in FIG. 1, highlighting interconnections there between.

Figure 1:
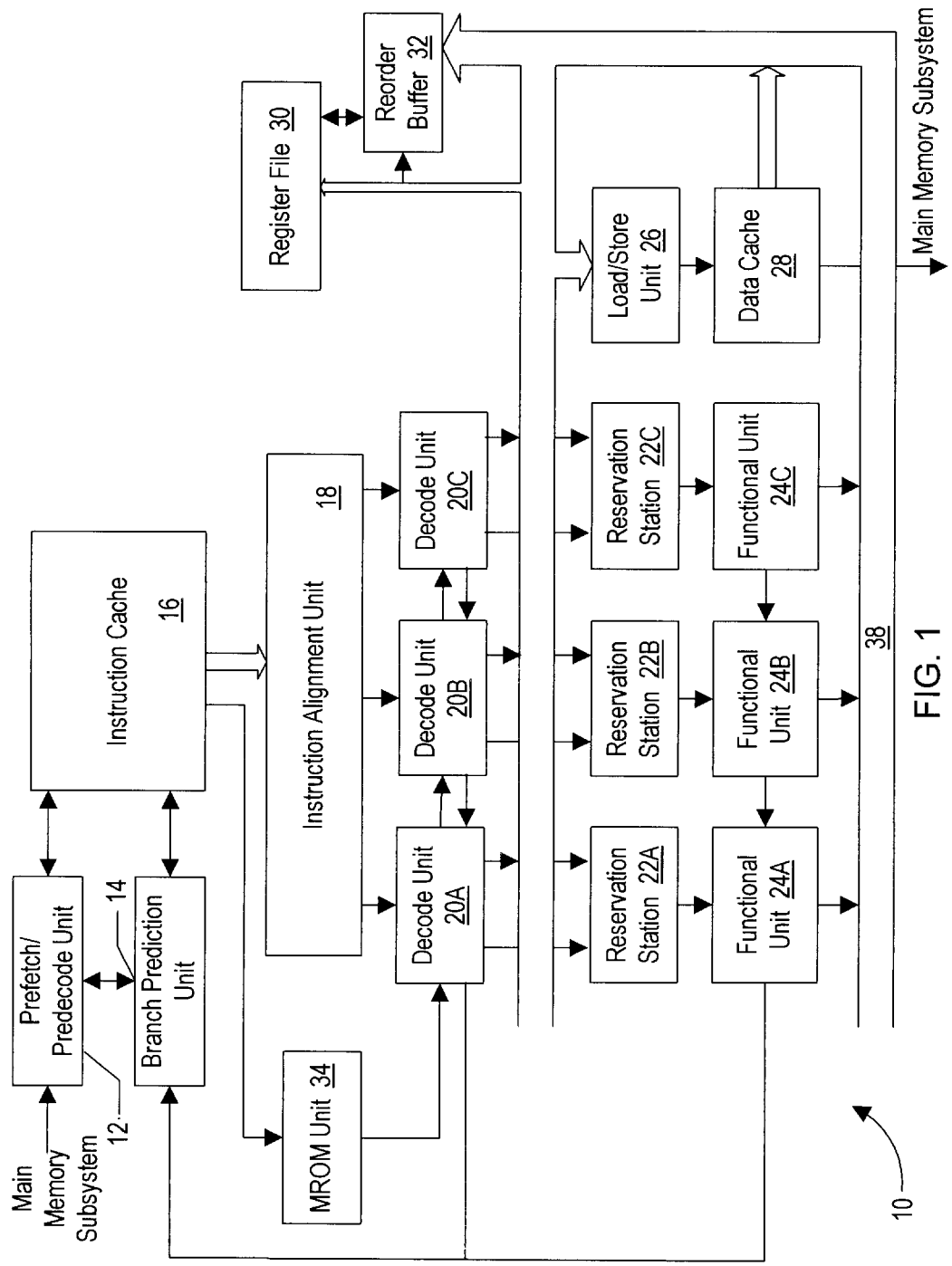
FIG. 1 is a block diagram of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, microprocessor 10 is configured to execute instructions in an efficient manner which balances the complexity of functional units 24 with the performance level achievable by microprocessor 10. Microprocessor 10 classifies an instruction into one of three possible categories: single dispatch instructions, multiple dispatch instructions, and microcode instructions. Single dispatch instructions are executed by a single functional unit 24A–24C. Multiple dispatch instructions are executed by multiple functional units 24, but are concurrently dispatched to the multiple reservation stations 22 coupled to the multiple functional units 24. A multiple dispatch instruction is issued to a predetermined fixed number of reservation stations 22. Microcode instructions are parsed into multiple single dispatch instructions which may be dispatched to reservation stations 22 during a plurality of consecutive clock cycles. The number of instructions used to perform the microcode instruction may vary dependent upon the instruction. Advantageously, many reasonably complex instructions may be classified as single dispatch instructions. More complex instructions may be classified as multiple dispatch instructions, and the most complex instructions may be classified as microcode instructions. Performance of the microprocessor may be increased by the inclusion of instructions within the single dispatch instructions, since a single storage location within reorder buffer 32 is allocated for the instructions. Conversely, multiple storage locations are allocated to the multiple dispatch instructions (one per issue position to which the multiple dispatch instructions are dispatched). Similarly, one reorder buffer storage location is allocated to each single dispatch instruction created by MROM unit 34 for a microcode instruction. However, inclusion of instructions with the single dispatch instruction category may increase the complexity of the functional units 24. Therefore, the three categories of instructions are supported for optimizing the performance/complexity compromise.

Each issue position (formed by a reservation station 22A–22C and the corresponding functional unit 24A–24C) may be configured to perform multiple instruction operations with regard to an instruction received therein. Each instruction operation is represented by an independent control vector stored in the corresponding functional unit 24A–24C. The control vector includes control bits for controlling the dataflow elements of the functional unit 24 in order to produce the particular instruction operation. Advantageously, instruction operations are reduced to control bits prior to the instruction operation being selected for execution.

The number of available instruction operations is determined via a compromise between complexity of the functional units 24 and the performance level achieved by microprocessor 10. For example, many x86 instructions utilize a memory operand. These instructions imply an address generation instruction operation, a load and/or store memory operation, and the explicit operation defined for the instruction. The load/store memory operation is performed by load/store unit 26. The address generation operation and the explicit operation may be performed by a single issue position. Instructions using memory operands may thereby be single dispatch instructions, advantageously increasing performance by occupying only one storage location within reorder buffer 32. It is noted that certain memory operand addressing modes (such as those which employ the SIB byte) may not be single dispatch instructions.

An example of complexity reduction at the possible expense of performance is the x86 instructions which modify more than one location in register file 30. For example, the POP instruction has a destination register and also updates the ESP register. The POP instruction may be classified as a multiple dispatch instruction, wherein the first issue position modifies the destination register and the second issue position updates the ESP register. Control vectors are stored for each instruction operation performed with respect to a particular instruction. One control vector may be performed by functional unit 24 during a particular clock cycle.

For the particular embodiment discussed herein, fast path instructions are an example of single dispatch instructions. Additionally, double dispatch instructions are an example of multiple dispatch instructions wherein the predetermined fixed number of issue positions is two. Still further, microcode instructions may be referred to as MROM instructions. MROM unit 34 is an example of a microcode unit.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 16 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

Start bits 10000
End bits 00001
Functional bits 11000

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
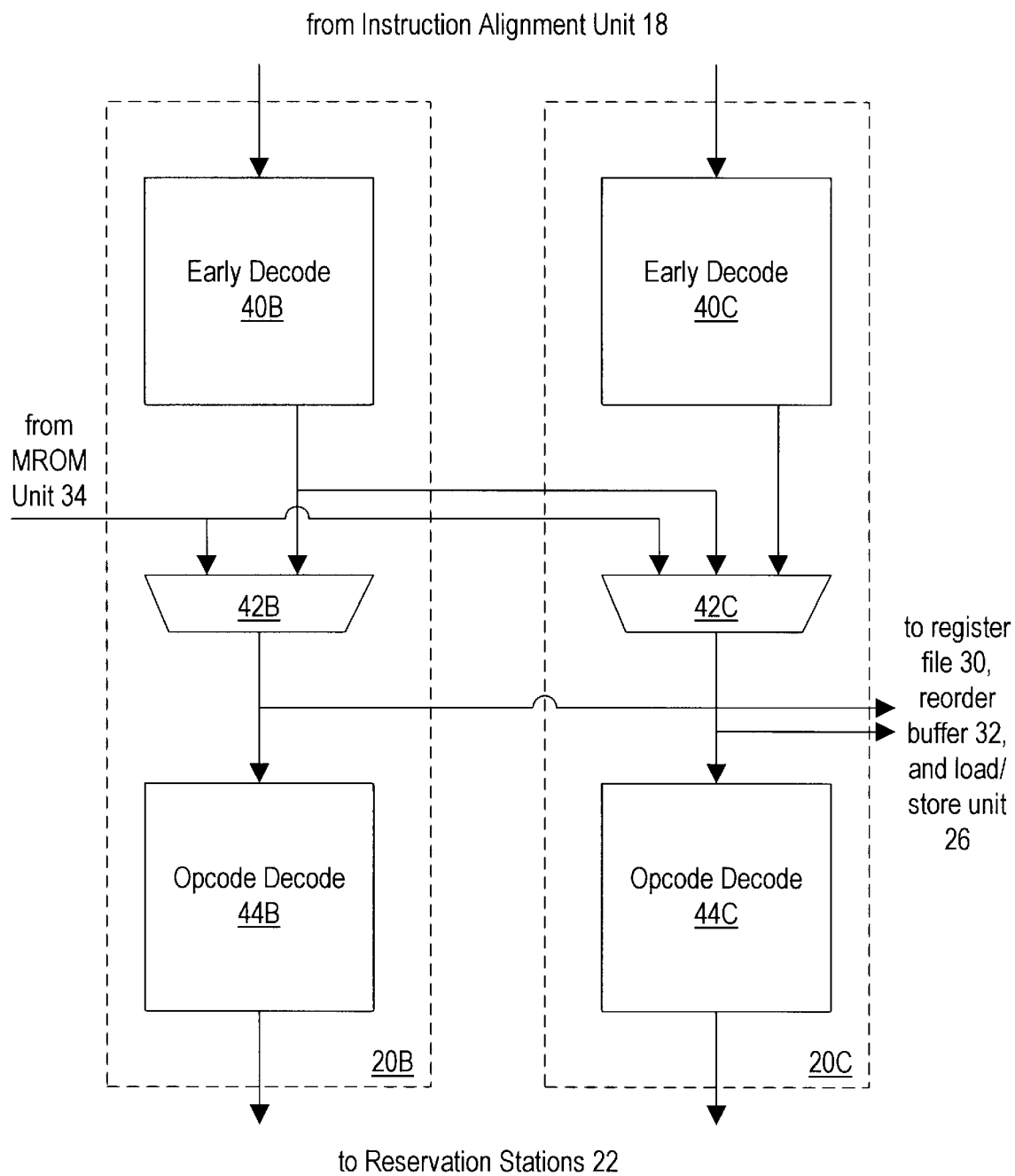
FIG. 2 is a block diagram of one embodiment of two decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

It is noted that double dispatch instructions may be routed through MROM unit 34, as described above. Alternatively, double dispatch instructions may be detected by instruction scanning logic within instruction cache 16 and routed through instruction alignment unit 18 to decode units 20. Double dispatch instructions may be routed to a pair of decode units 20. More generally, a multiple dispatch instruction may be routed to multiple decode units 20 via detection by the instruction scanning logic and appropriate routing through instruction alignment unit 18.

Figure 3:
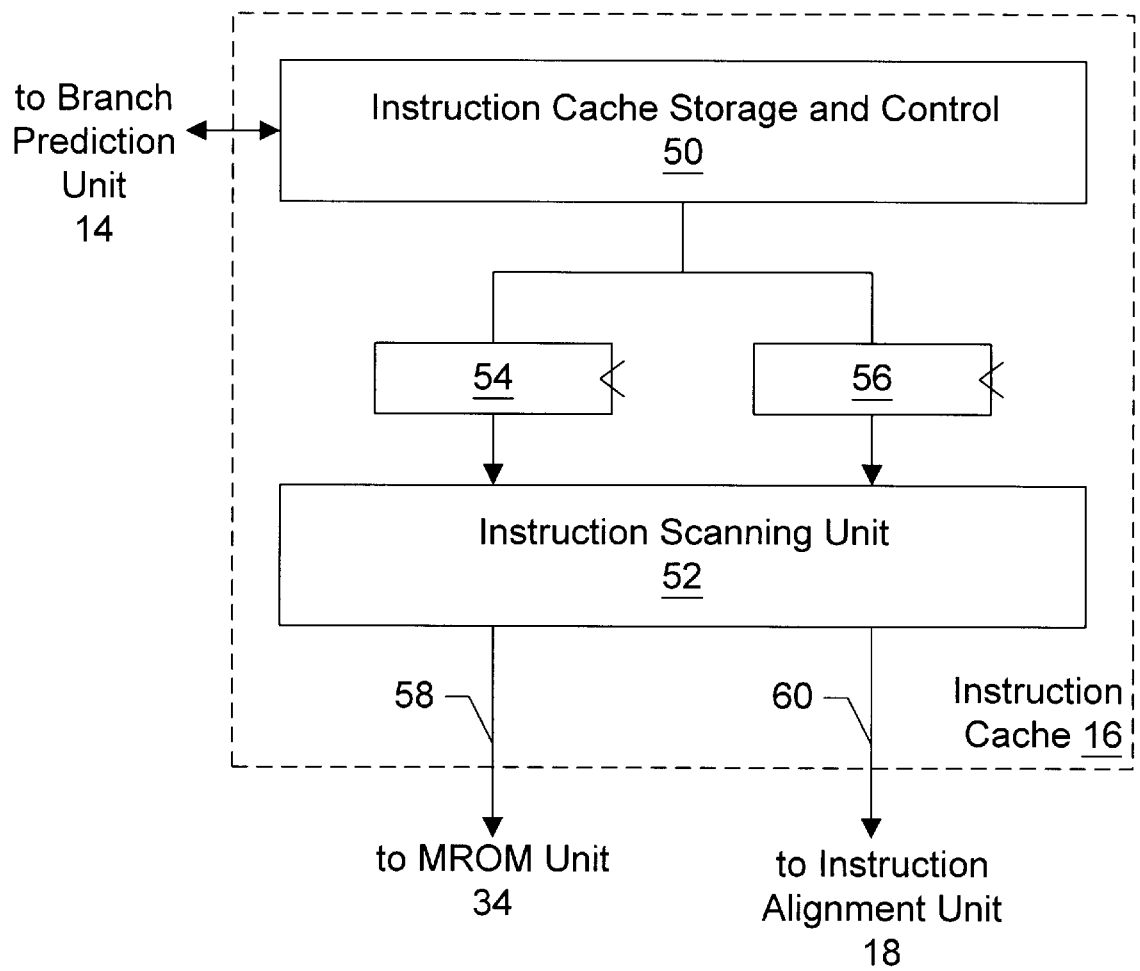
FIG. 3 is a block diagram of one embodiment of an instruction cache shown in FIG. 1.

Turning now to FIG. 3, a block diagram of one embodiment of instruction cache 16 is shown. Instruction cache 16 includes an instruction cache storage and control block 50 and an instruction scanning unit 52. Between instruction cache storage and control block 50 and instruction scanning unit 52 are coupled a pair of storage devices 54 and 56. Instruction scanning unit 52 is coupled to MROM unit 34 via a microcode instruction bus 58. Additionally, instruction scanning unit 52 is coupled to instruction alignment unit 18 via an instruction bus 60. Instruction cache storage and control block 50 is coupled to branch prediction unit 14.

Instruction cache storage and control block 50 stores cache lines of instructions for execution by microprocessor 10. Instructions are fetched down a speculative instruction path predicted by branch prediction unit 14. As a cache line of instructions are fetched, branch prediction unit 14 predicts the next cache line of instructions within the speculative instruction stream based upon branch prediction information stored therein. The instructions fetched during a clock cycle are conveyed to storage devices 54 and 56. If either of storage devices 54 and 56 are storing previously fetched instruction bytes which have not been conveyed to instruction alignment unit 18 or MROM unit 34, the storage device does not store instruction bytes from instruction cache storage and control block 50. The instruction bytes are reconveyed by instruction cache storage and control block 50 during a subsequent clock cycle. However, if either of storage devices 54 and 56 are not storing previously fetched instruction bytes, the storage device captures instruction bytes from instruction cache storage and control unit 50. Additionally, predecode data corresponding to the instruction bytes is captured in storage devices 54 and 56. In one embodiment, each storage device 54 and 56 is capable of storing eight instruction bytes and corresponding predecode data. Storage devices 54 and 56 may comprise one or more registers, for example.

Instruction scanning unit 52 examines the predecode data stored in storage devices 54 and 56, thereby detecting the valid instructions stored therein. Additionally, instructions are categorized as single dispatch, multiple dispatch, or microcode instructions by instruction scanning unit 52. In one embodiment, an instruction is a microcode instruction or a multiple dispatch instruction if the functional bit of predecode data corresponding to the end byte of the instruction is set. If the functional bit is clear, the instruction is a single dispatch instruction. Instruction scanning unit 52 identifies multiple dispatch instructions by partially decoding the instructions and routes them to instruction alignment unit 18 or MROM unit 34, depending upon the embodiment. The multiple dispatch instructions are tagged as being multiple dispatch such that they are routed to the appropriate number of issue positions.

When microcode instructions are dispatched to MROM unit 34 during a clock cycle, no instructions are dispatched to instruction alignment unit 18. In this manner, MROM unit 34 may dispatch instructions corresponding to the microcode instruction into as many issue positions as needed when the instructions are inserted between early decode units 40 and opcode decode units 44. If MROM unit 34 uses additional cycles to perform a particular microcode instruction, then opcode decode units 40 may be stalled while MROM unit 34 continues to dispatch instructions. If multiple dispatch instructions are double dispatch (i.e. occupying two issue positions), then a single dispatch instruction may be dispatched concurrently with the multiple dispatch instruction. The single dispatch instruction may be immediately prior to the multiple dispatch instruction in program order, in which case the single dispatch instruction is routed to issue position zero. Alternatively, the single dispatch instruction may be immediately subsequent to the multiple dispatch instruction, in which case the single dispatch instruction is routed to issue position two. More generally, a number of single dispatch instructions may be dispatched concurrently with a multiple dispatch instruction. The number of concurrently dispatched single dispatch instructions may be up to the number of issue positions minus the number of issue positions occupied by the multiple dispatch instruction. Because multiple dispatch instructions occupy a predetermined fixed number of issue positions, the number of concurrently dispatched single dispatch instructions may be determined upon detection of the multiple dispatch instruction. In contrast, microcode instructions may be dispatched to any number of issue positions according to the routine stored in MROM unit 34. Therefore, microcode instructions are dispatched without concurrent dispatch of other instructions.

Figure 4:
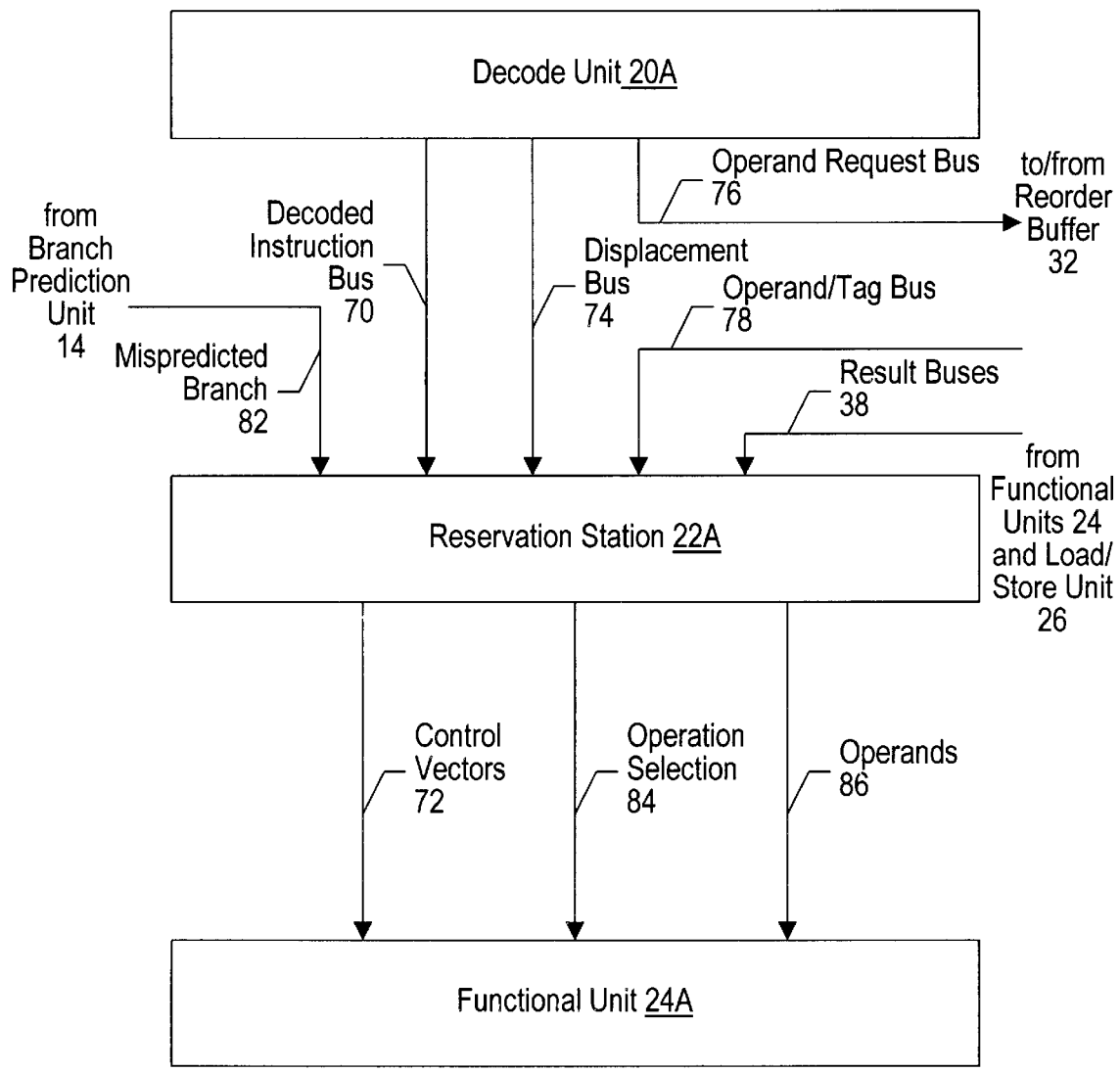

Turning now to FIG. 4, a block diagram of decode unit 20A, reservation station 22A, and functional unit 24A is shown. Interconnections between these units are shown according to one embodiment of microprocessor 10. Interconnections between decode units 20B–20C, reservation stations 22B–22C, and functional units 24B–24C may be similar.

Decode unit 20A decodes an instruction and transfers the decoded instruction upon a decoded instruction bus 70 to reservation station 22A. The decoded instruction may include an indication that the instruction is a single dispatch or multiple dispatch instruction. If the instruction is a multiple dispatch instruction, then an indication of which portion of the multiple dispatch instruction that reservation station 22A and functional unit 24A are intended to perform is also conveyed. As noted above, microcode instructions are decomposed by MROM unit 34 into multiple single dispatch instructions. Reservation station 22A decomposes the decoded instruction into a set of control vectors, and transfers these control vectors to functional unit 24A upon a control vectors bus 72. As used herein, a "control vector" or a "control bit vector" is a set of control bits defining the operation of functional unit 24A during a clock cycle in which the associated instruction is executed. The control bits are indicative of the operation of the dataflow elements within functional unit 24A to produce the intended instruction operation. An instruction may be decomposed into multiple control vectors to be executed by functional unit 24A. In one embodiment, up to two control vectors may be associated with a particular instruction. For multiple dispatch instructions, the indication of which portion of the multiple dispatch instruction is to be executed is used to generate the control vectors in addition to the decoded instruction. Different control vectors are generated depending upon which portion of the multiple dispatch instruction is to be executed. The term "instruction" as used below with respect to FIGS. 4, 5, and 6 refers to either a single dispatch instruction, a portion of a multiple dispatch instruction, or a single dispatch instruction formed by MROM unit 34 in response to a microcode instruction.

Displacement data associated with an instruction is provided from decode unit 20A to reservation station 22A upon a displacement bus 74 coupled there between. Decode unit 20A requests operand values for source operands as well as provides the destination operand address for register operands upon an operand request bus 76. Additionally, immediate data may be conveyed upon operand request bus 76. Operand request bus 76 is coupled to reorder buffer 32, which returns the operand value, tag, or immediate data upon operand/tag bus 78 to reservation station 22A. Additionally, a plurality of result buses 38 are coupled to reservation station 22A. Result buses 38 convey results generated by functional units 24 and load/store unit 26 during a clock cycle, as well as an indication of the validity of each result conveyed. Additionally, a reorder buffer tag indicative of each result is conveyed upon result buses 38. The reorder buffer tag may be compared to operand tags stored within reservation station 22 to determine if the result is used by instructions stored therein. Furthermore, reorder buffer 32 uses the reorder buffer tag to store the result. It is noted that a result from load/store unit 26 may be the value transferred from data cache 28 in response to a load instruction.

A mispredicted branch bus 82 is coupled between reservation station 22A and branch prediction unit 14. When a mispredicted branch instruction is detected by branch prediction unit 14, a value indicative of the location within reorder buffer 32 storing the mispredicted branch instruction is conveyed upon mispredicted branch bus 82. Instructions subsequent to the mispredicted branch instruction are discarded by reservation station 22A. It is noted that, in other embodiments, mispredicted branch instructions may be signaled by reorder buffer 32 or by functional units 24.

In addition to control vectors bus 72, an operation selection bus 84 and an operands bus 86 are coupled between reservation station 22A and functional unit 24A. Operation selection bus 84 is configured to convey signals indicative of the instruction operation selected for execution during a clock cycle. In one embodiment, operation selection bus 84 conveys signals indicative of a particular control vector stored within functional unit 24A. The control vector causes the selected instruction operation to be performed by functional unit 24A. Operands bus 86 conveys the operand values associated with the instruction operation selected for execution during the clock cycle. The operand values may include register operand values, memory operand values (provided by load/store unit 26), and/or displacement and immediate data associated with the instruction.

Figure 5:
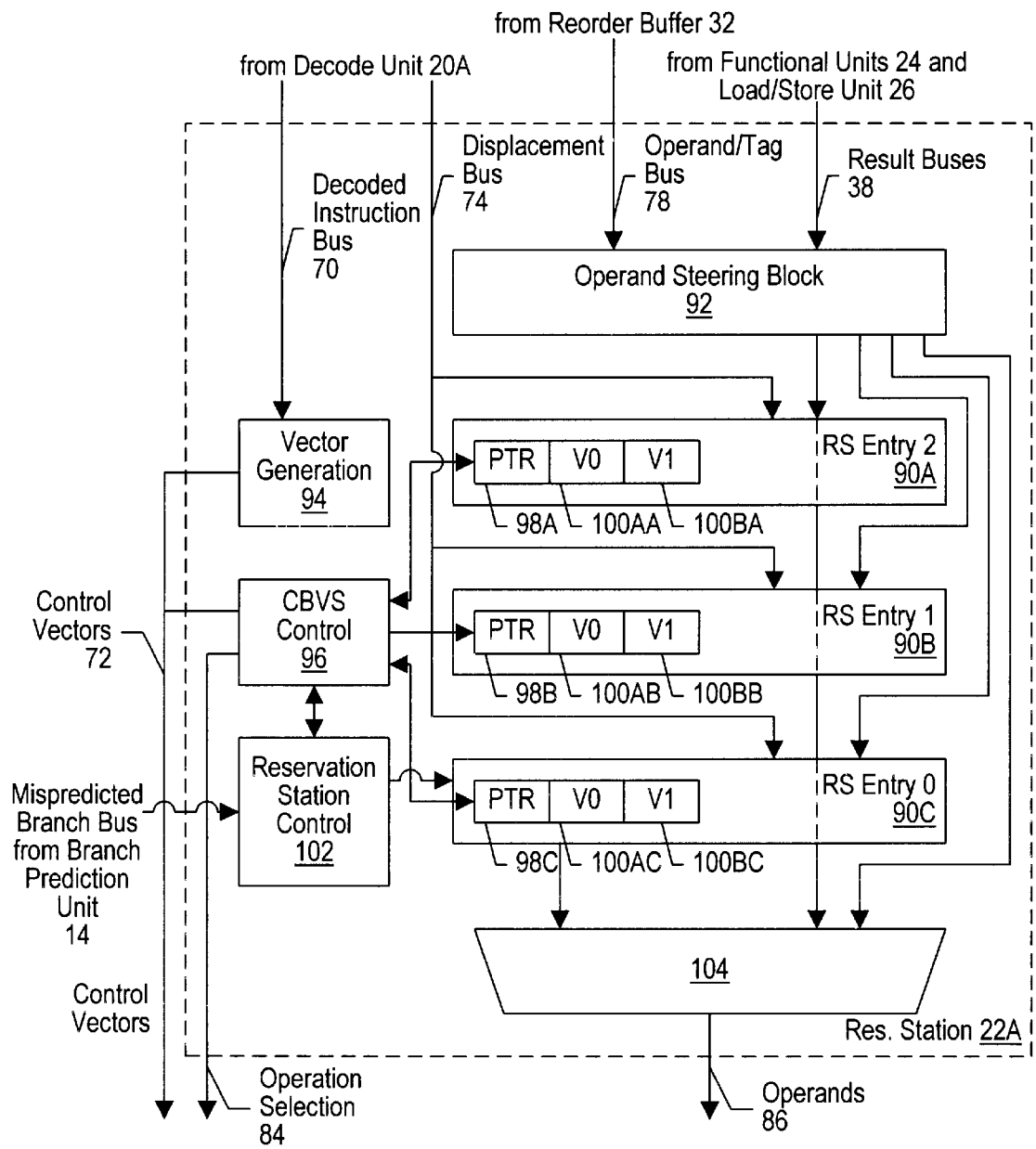
FIG. 5 is a block diagram of one embodiment of the reservation station shown in FIG. 4.

Turning now to FIG. 5, a diagram of one embodiment of reservation station 22A is shown. Reservation stations 22B–22C may be configured similarly. For simplicity of the discussion of FIG. 5, reference may be made to an instruction being stored in a reservation station entry. However, instruction information such as operands are stored in the reservation station entries. The instruction opcode is stored as one or more control vectors within functional unit 24A.

Generally speaking, reservation station 22A is configured to store instruction information regarding an instruction within one of reservation station entries 90A, 90B, and 90C (collectively referred to as reservation station entries 90). An operand steering block 92 and displacement bus 74 are coupled to reservation station entries 90. Operands may be received from operand steering block 92 and from displacement bus 74. Additionally, reservation station 22A includes a vector generation circuit 94. Vector generation circuit 94 receives the decoded instruction from decoded instruction bus 70 and produces corresponding control vectors upon a control vector bus 72. The control vectors are thereby conveyed to functional unit 24A for storage. Advantageously, decomposition of an instruction into control bits is performed prior to an instruction being selected for execution. The control bits are stored within functional unit 24A instead of within reservation station 22A.

A value is conveyed upon control vectors bus 72 along with the control vectors. The value is indicative of the validity of the conveyed control vectors, as well as which vector storage within functional unit 24A is selected to store the control vectors. Validity of the vectors and vector storage selection is performed by a control bit vector storage (CBVS) control unit 96, according to the vector storages allocated to reservation station entries 90. In one embodiment, the value comprises a plurality of write enable signals, one for each vector storage included in functional unit 24. Each write enable signal, when asserted, indicates that the corresponding vector storage is to store the control vectors conveyed. If none of the write enable signals are asserted, then the control vectors upon control vector bus 72 are invalid. CBVS control unit 96 is coupled to reservation station entries 90, and allocates a vector storage which is not allocated to a reservation station entry 90A–90C which is storing valid instruction information. Each reservation station entry 90 stores a pointer value indicative of the vector storage storing the control vectors corresponding to the instruction whose instruction information is stored by that reservation station entry. For example, reservation station entry 90A includes a pointer value storage location 98A. Similarly, reservation station entries 90B and 90C include pointer value storage locations 98B and 98C, respectively. In one embodiment, if more that one vector storage is not allocated to a reservation station entry 90, CBVS control unit 96 performs an ordered selection from among the unallocated vector storages. If a first vector storage is unallocated, it is allocated to store the newly generated control vectors. If the first vector storage is storing control vectors, then a second vector storage is allocated if not currently being used, etc.

Each reservation station entry 90 may include a plurality of vector valid indications. The vector valid indications are indicative of the validity of each control vector within the vector storage indicated by the respective pointer value. In one embodiment, each vector valid indication is a bit indicative, when set, that the associated vector is valid. In the embodiment shown in FIG. 5, up to two control vectors may be valid for an instruction. Two vector valid indications are therefore stored within each reservation station entry 90A–90C, shown as reference numbers 100AA and 100BA for reservation station entry 90A. Similarly, vector valid indications are shown as reference numbers 100AB, 100BB, 100AC, and 100BC for reservation stations 90B and 90C.

CBVS control unit 96 is further configured to select which instruction is executed by functional unit 24A. An instruction may be selected for execution if its operands have been provided or are being provided during a clock cycle. If multiple instructions are eligible for execution, then the instruction which is first in program order is executed. It is noted that the instruction stored in reservation station entry 90A is prior to the instructions stored in reservation station entries 90B and 90C in program order, according to one embodiment. Similarly, the instruction stored in reservation station entry 90B is prior to the instruction stored in reservation station entry 90C in program order. When an instruction is selected for execution by CBVS control unit 96, the corresponding vector storage and control vector within that vector storage are indicated via values upon operation selection bus 84. When the operation indicated by the selected control vector is completed by functional unit 24A, the associated vector valid indication is set to indicate that the control vector is invalid. When each of the vector valid indications within a reservation station entry 90 each indicate invalid, then the instruction is complete. It is noted that the two control vectors are ordered. If the first control vector is valid (as indicated by vector valid indication 100AA, 100AB, or 100AC), it is executed. If the second control vector is valid (as indicated by vector valid indication 100BA, 100BB, or 100BC) and the first control vector is invalid, then the second control vector is executed. In one embodiment, the first control vector may be chosen for execution when the operands needed to execute the first control vector are available. Other operands (used by the second control vector) may not be available at the time the first control vector is executed. Certain instructions may provide an operand to the second control vector via execution of the first control vector. For example, instructions utilizing a memory operand may generate an address of the memory operand using the first control vector. The second vector then utilizes the value stored at the address as an operand.

A completed instruction is deleted from reservation station 22A by shifting down the instruction information stored within subsequent reservation station entries 90. For example, if the instruction stored within reservation station entry 90A is completed, then the instruction information in reservation station entries 90B and 90C are moved into reservation station entries 90A and 90B, respectively. It is noted that the vector storages within functional unit 24A may not be shifted. Instead, the pointer value stored within each reservation station entry 90A–90C is indicative of the vector storage storing the associated instruction.

If a mispredicted branch instruction is detected by branch prediction unit 14, then the value indicative of the reorder buffer location storing the branch instruction is received by a reservation station control unit 102 coupled to reservation station entries 90. Reservation station control unit 102 causes the vector valid indications to be set to invalid for each instruction stored within reservation station entries 90 which is subsequent to the mispredicted branch instruction. The instructions are thereby discarded from reservation station 22A. It is noted that the reorder buffer storage location storing each instruction may be stored within reservation station entries 90. Reservation station control unit 102 compares the stored reorder buffer indications to the mispredicted branch reorder buffer indications. Those instructions having reorder buffer indications which indicate that the instruction is subsequent to the mispredicted branch instruction in program order are discarded under the control of reservation station control unit 102. It is further noted that conditions other than a mispredicted branch may cause instructions to be discarded. For example, an instruction which accesses memory may create an exception. When an exception occurs, instruction execution begins within an exception handling routine. Such conditions may be handled similar to the mispredicted branch instruction (i.e. by discarding instructions subsequent to the instruction causing the condition).

In another embodiment, mispredicted branches and exceptions may be handled in a different manner. According to this embodiment, reorder buffer 32 communicates with load/store unit 26 upon detection of a mispredicted branch or exception. Concurrently, instruction fetching begins at the corrected address. Load/store unit 26 discards load and store memory accesses which are subsequent to the mispredicted branch or exception. Additionally, load memory accesses which are discarded forward false data to instructions within reservation stations 22 which are dependent upon the load memory accesses. In this manner, the instructions which are mispredicted execute and forward incorrect results to reorder buffer 32 (and to subsequent instructions within the mispredicted path, if applicable). After several clock cycles have elapsed, the mispredicted instructions will have cleared out of microprocessor 10 through the normal execution of instructions. Reorder buffer 32 discards the mispredicted instructions when results have been provided for those instructions. This embodiment of mispredicted branch and exception handling may be useful for microprocessors in which the branch misprediction penalty (i.e. the number of clock cycles from detection of a mispredicted branch instruction to the execution of instructions along the corrected path) is relatively long.

In still another embodiment, an alternative method of branch misprediction recovery is employed. For this embodiment, each reservation station entry 90 includes a branch misprediction bit. The bit indicates, when set, that the corresponding instruction was stored within the reservation station entry 90 when a mispredicted branch was detected.

When reservation station control unit 102 receives an indication of a mispredicted branch, the branch misprediction bit is set for each entry 90 which is storing an instruction. Instruction execution and retirement (by reorder buffer 32) continues until the mispredicted branch instruction is retired. Reorder buffer 32 signals reservation stations 22 that the mispredicted branch instruction is retired. Instructions which remain within reservation stations 22 for which the corresponding branch misprediction bit is set are then discarded. Since these discarded instructions were stored in reservation stations 22 prior to detection of the mispredicted branch and yet remain in reservation stations 22 upon retirement of the mispredicted branch instruction, these instructions are subsequent to the mispredicted branch instruction (i.e. along the mispredicted instruction path). Instructions for which the branch misprediction bit is clear are retained by reservation stations 22 until they are executed. Since these retained instructions were received by reservation stations 22 subsequent to detection of the mispredicted branch instruction, these instructions reside along the correct instruction path indicated by the branch instruction.

Operand steering block 92 is configured to select operands conveyed upon operand/tag bus 78 and result buses 38 for storage within reservation station entries 90. Operands and tags conveyed upon operand/tag bus 78 are stored into the reservation station entry 90A–90C allocated to the instruction associated with the operands. Reorder buffer tags from result bus 38 are used to determine if any of the results from result bus 38 are to be stored within reservation station entries 90. In one embodiment, instruction information (such as operands, operand tags, displacement data, etc.) is stored into reservation station entry 90C and shifted to the reservation station entry 90 which is intended to receive the instruction information under the control of reservation station control unit 102.

Reservation station 22A is configured to select an instruction for execution if one or more of its operands are being provided during a clock cycle. The operand or operands thus provided are conveyed to a selection device 104 along with operand values stored within reservation station entries 90. A selection device is a device configured to select at least one output value from a plurality of input values. The output value is selected according to select controls provided by a control unit coupled thereto. Selection device 104 selects the operand values associated with the instruction operation to be executed by functional unit 24A via select controls received from reservation station control unit 102. In one embodiment, selection device 104 comprises a plurality of multiplexors. One multiplexor is included for each operand. For example, in embodiments of reservation station 22A configured to store x86 instructions, a multiplexor is included for each of two register or memory operands and for a displacement value. If an immediate value is included in an instruction, that value is stored as one of the two operands. The selected operand values are conveyed upon operand bus 86 to functional unit 24A.

It is noted that vector generation circuit 94 may be included within decode unit 20A, in another embodiment. Such an embodiment would convey control vectors from decode unit 20A to functional unit 24A directly, while storing the operands and other instruction information within reservation station 22A.

Figure 6:
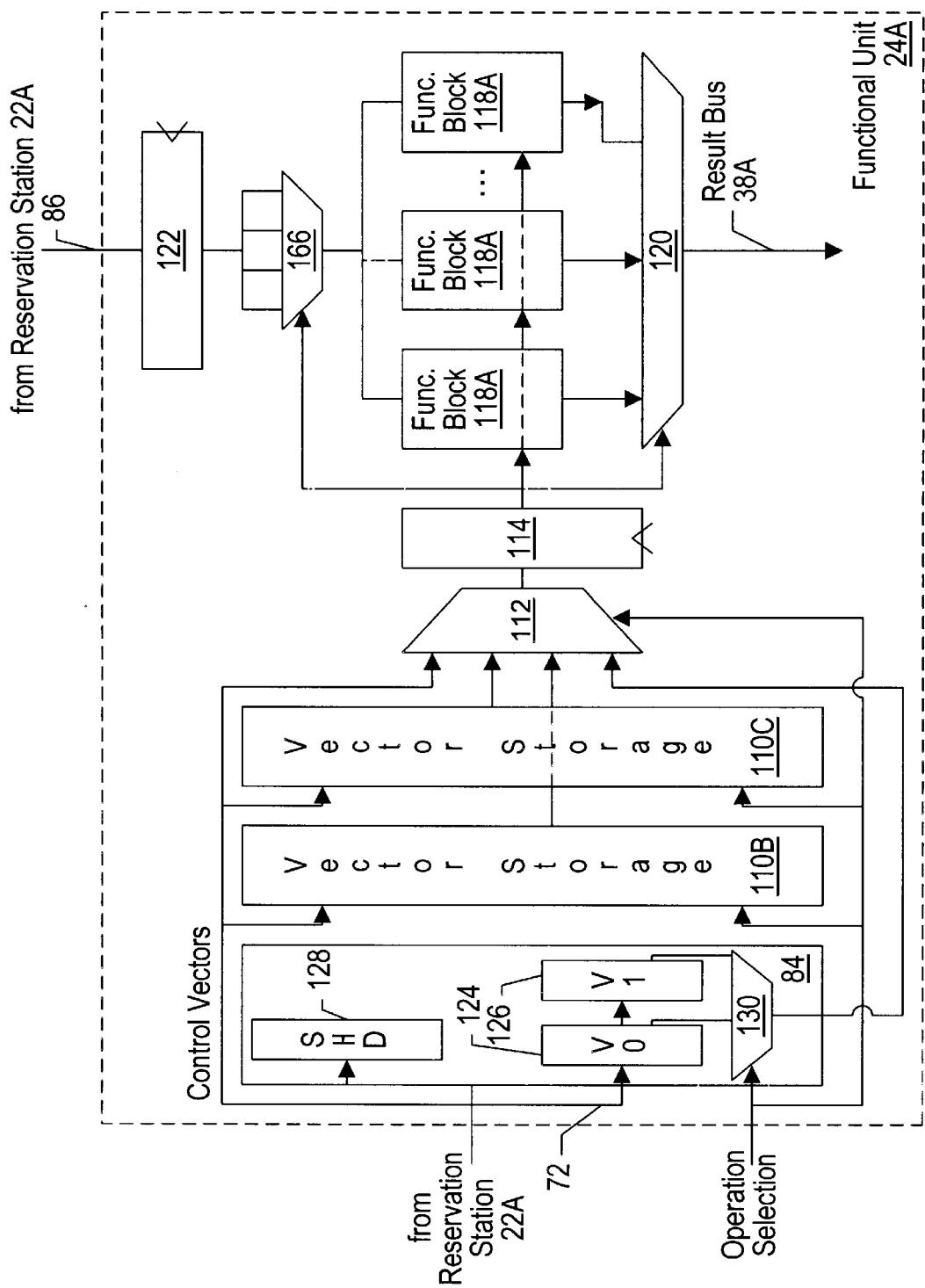
FIG. 6 is a block diagram of one embodiment of the functional unit shown in FIG. 4.

Turning now to FIG. 6, a diagram of one embodiment of functional unit 24A is shown. Functional units 24B–24C may be configured similarly. Functional unit 24A includes a plurality of vector storages 110A, 110B, and 110C (collectively referred to as vector storages 110). Vector storage 110A is shown in detail, and vector storages 110B and 110C may be configured similarly. Vector storages 110 form a control bit vector storage for the control bits representing instructions which are currently stored in reservation station 22A. Control vector bus 72 and operation selection bus 84 from reservation station 22A are coupled to each of vector storages 110. Additionally, control vector bus 72 is coupled as an input to a selection device 112 along with vector storages 110. Operation selection bus 84 is coupled to selection device 112 to provide select controls. A vector of control bits is selected by selection device 112 and conveyed through a storage device 114 to an operand selection device 116, a plurality of functional blocks 118A–118N (collectively referred to as functional blocks 118) and a result selection device 120. Operand selection device 116 selects from operands stored in a operand storage device 122, which stores operands received upon operand bus 86 from reservation station 22A. The operands selected by operand selection device 116 are conveyed to functional blocks 118, which compute a result by operating upon the operands. The results from each functional block 118A–118N are conveyed to result selection device 120, which selects a result for conveyance upon a result bus 38A. Result bus 38A is one of result buses 38 (shown in FIGS. 1, 4 and 5).

Each vector storage 110A–110C is configured to store multiple control vectors corresponding to a particular instruction. In one embodiment, up to two control vectors are stored. Internal portions of such an embodiment are shown within vector storage 110A in FIG. 6. Vector storage 110A includes a first vector storage 124, a second vector storage 126, and a shared vector storage 128. Shared vector storage 128 stores control bits which are common to the control vectors (i.e. both control vectors include the set of control bits stored in shared vector storage 128). Advantageously, bits which are common to the vectors are stored only once within vector storage 110A. The shared bits are conveyed along with the first or second vector to selection device 112. First vector storage 124, second vector storage 126, and shared vector storage 128 comprise at least one register each, in one embodiment.

A vector selection multiplexor 130 is included in vector storage 110A. One of the signals upon operation selection bus 84 is a selection control for multiplexor 130. The selection control indicates whether the first or second vector is selected for execution. It is noted that the same selection control which is connected to multiplexor 130 may be connected to similar multiplexors within vector storage 110B and 110C. Selection controls for selection device 112 may then cause the selection of the appropriate control vector for execution.

Decomposing an instruction into multiple control vectors may advantageously allow simpler functional blocks to be included within functional unit 24A. As used herein, a "functional block" is a collection of one or more dataflow elements configured to perform a particular manipulation upon input operands. Exemplary functional blocks may be configured to perform an addition, a logical function (i.e. AND, OR, XOR, etc.), a bit shift, etc. Instead of including functionality for executing the entire operation in a single clock cycle, functionality may be included for performing each of the instruction operations specified by a particular instruction. Each instruction operation may then be executed during a different clock cycle. For example, instructions which include a memory operand specify an address generation instruction operation for generating the address of the memory operand (an implicit instruction operation) and an explicit instruction operation defined by the opcode of the instruction. A first control vector may be generated to perform the address generation, and then a second control vector to perform the explicit instruction operation. Additionally, logic for generating the vectors is no longer included in the instruction execution cycle. Cycle time used to perform an operation in the functional unit is advantageously reduced by the lack of control bit generation by the functional unit. The functional unit executes the vector according to the control bits, whether or not the vector is a portion of a more complex instruction or represents the instruction completely. Still further, functional unit 24A may execute other operations (from other control vectors) between the execution of the first and second control vector defining an instruction. If the first control vector is an address generation for a memory access, for example, multiple clock cycles may be necessary to perform the memory access. The second control vector may require the memory access value, and so functional unit 24A might otherwise be stalled during the memory access cycles.

The vectors generated for a particular instruction are dependent upon a "protocol" for that instruction. The instruction set is divided into one of several protocols, which indicate which control vectors are used, the instruction operation performed by each control vector, and the relationship between the control vectors. Table 1 (shown further below) lists an exemplary set of protocols for an embodiment having up to two control vectors per instruction.

As noted above, selection device 112 is configured to select a control vector for execution during a clock cycle. Selection device 112 is configured to select between the control vectors stored in vector storages 110, as well as from the control vectors conveyed upon control vector bus 72. In this manner, an instruction operation may be selected for execution during the same clock cycle it is stored into reservation station 22A and vector storages 110. Performance may be increased for cases in which reservation station 22A is empty when an instruction is dispatched and its operands are available. Operation selection bus 84 includes signals forming the select controls for selection device 112. In one embodiment, selection device 112 comprises at least one multiplexor.

Storage device 114 (comprising at least one register, in one embodiment) stores the control vector selected for execution. During a subsequent clock cycle, control bits are conveyed to operand selection device 116, functional blocks 118, and result selection device 120. Therefore, a control vector may include control bits which form selection controls for operand selection device 116, controls for dataflow elements within functional blocks 118, and selection controls for result selection device 120. Storage device 122 (which similarly comprises at least one register, in one embodiment), stores operands received upon operand bus 86 from reservation station 22A.

Operand selection device 116 selects operands from the operands provided by reservation station 22A. An instruction may operate upon a pair of operands, or an operand and a displacement or immediate value. Operand selection device 116 is configured to select operands such that the operands are conveyed to functional blocks 118 to perform the instruction operation specified by the control vector. In addition, operand selection device 116 may be configured to provide sign extension and zero extension of operands which contain fewer bits than functional blocks 118 are configured to operate upon. In one embodiment, functional blocks 118 are configured to operate upon 32 bit operands and operands may be 8, 16, or 32 bits. Still further, operand selection device 116 may be configured to select a field of an operand for use by a control vector. It is noted that certain x86 instructions access a byte other than the least significant byte of a register. Field selection allows this byte to be selected. In one embodiment, operand selection device 116 comprises a plurality of cascaded multiplexors configured to select operands, select fields from those operands, and perform sign or zero extension. It is noted that different operands may be conveyed to various functional blocks 118A–118N during the same clock cycle.

Result selection device 120 receives results computed by each of functional blocks 118 and selects a result for conveyance upon result bus 38A. As noted above, a reorder buffer tag and an indication that the result is valid are conveyed upon result bus 38A as well as the result generated. It is noted that separate valid indications may be transferred to reorder buffer 32 and reservation stations 22B–22C, reservation station 22A, and load/store unit 26. A first valid indication transferred to reorder buffer 32 and reservation stations 22B–22D indicate that the result generated is a final result for the instruction being executed. The result may be stored by reorder buffer 32 for later storage within register file 30. Additionally, the result may be collected by reservation stations 22B–22C if an operand tag stored therein matches the reorder buffer tag of the result. A second valid indication transferred to reservation station 22A may indicate valid during a clock cycle in which the first valid indication indicates invalid. An exemplary situation wherein the second valid indication indicates valid and the first valid indication indicates invalid is the generation of an intermediate result upon execution of a first control vector. The intermediate result may then be used as an operand of the second control vector. Finally, a third valid indication may be transferred to load/store unit 26 to indicate that an address generation has been performed by functional unit 24A. Load/store unit 26 receives and stores the address for access to data cache 28.

It is further noted that, in one embodiment, portions of a control vector may be stored in an encoded format within vector storages 110. In such an embodiment, combinatorial logic blocks would be inserted between vector storages 110 and storage device 114. A single logic block may be inserted between selection device 112 and storage device 114, or multiple logic blocks may be inserted between vector storages 110 and selection device 112.

Table 1 shows an exemplary set of control vector protocols for x86 fast path instructions:

TABLE 1

Exemplary Control Vector Protocols

| Protocol | First Vector | Second Vector |
|---|---|---|
| one operation | none | operation |
| load-op | address generation | operation |
| load-only | none | address generation |
| load-op-store | address generation | operation |
| op-store | address generation | operation |
| SRB | none | operand to L/S or address generation |
| FPU address gen. | address generation | address generation |
| Branch | none | operation |
| Load branch | address generation | operation |
| SIB | none | scaled addition |
| push | address generation | operation |
| pop | none | addition |
| divide | addition | subtraction |

The one operation protocol may be used for instructions having register operands and an instruction operation which may be performed by functional blocks 118 during a single clock cycle. The first control vector is not used, and the second control vector corresponds to the instruction operation. According to one embodiment of the present invention, each protocol which uses only one of the two control vectors uses the second control vector (i.e. the first control vector is unused). Instruction execution may begin with either the first control vector or the second control vector, dependent upon the protocol, but the instruction is always complete upon performance of the second control vector. Control logic may be simplified using this approach.

Instructions having memory operands utilize one of the load-op, load-only, load-op-store, or op-store protocols. If a memory operand is a source but not a destination, the load-op or load-only protocol may be used. If a memory operand is both a source and a destination, the load-op-store protocol is used. If a memory operand is a destination only, the op-store protocol is used. Generally speaking, each of these protocols includes a first vector which performs address generation (an implicit instruction operation), and a second vector which performs the explicit instruction operation defined by the opcode. The generated address is conveyed to load/store unit 26, which performs the loading or storing instruction operation. For protocols involving the load, the first vector is executed and the second vector is executed subsequent to receiving the load data. For protocols involving a store, the result is forwarded to load/store unit 26 for storage instead of to reorder buffer 32. It is noted that a store-only protocol may additionally be employed in which an address generation is performed by functional units 24, but the store data is captured directly from result buses 38 by load/store unit 26. Such a protocol may be used for the MOV instruction having a destination in a memory location, if the store data is generated by an instruction which is outstanding within microprocessor 10.

The SRB protocol is utilized by instructions which modify or access the special registers specified by the x86 microprocessor architecture. Microprocessor 10 stores a plurality of special registers in various locations, but most are concentrated in load/store unit 26. The special registers store information regarding processor state. For example, segment descriptors are stored in special registers. Additionally, debug features of microprocessor 10 are controlled by special registers, as well as the protected/unprotected mode of microprocessor 10, etc. Decode units 20 communicate directly with load/store unit 26 in order to transfer most information regarding special register loads and stores. A special register value may be read into or written from a register operand or a memory operand. For the register operand form, the SRB protocol passes the register value to load/store unit 26. For the memory operand, the SRB protocol specifies an address generation. The first control vector is not used for this protocol, and the second control vector causes the transfer of the register operand value to be stored into the special register to load/store unit 26. Alternatively, the second control vector may be used for the address generation.

The x86 microprocessor architecture defines floating point instructions. These instructions often operate upon operands stored upon a floating point stack containing eight entries. The floating point stack is reserved for use by the floating point instructions. A floating point unit executes the floating point operations, but the address for floating point load and store memory accesses is calculated by functional units 24 and load/store unit 26 performs the memory accesses. A floating point load/store operation may be a single precision value comprising 32 bits; a double precision value comprising 64 bits; or an extended precision value comprising 80 bits. Because integer values are at most 32 bits, microprocessor 10 executes floating point loads and stores in 32 bit portions (and a 16 bit portion for the extend precision operations). Therefore, a single precision access comprises one 32 bit portion; a double precision access comprises two 32 bit portions; and an extended precision access comprises two 32 bit accesses and one 16 bit access. Each load/store portion is executed in a separate functional unit 24. Therefore, generating an address for one of the portions includes generating the address defined by the floating point load or store, then adding an offset indicative of the portion being accessed. For the first 32 bit portion, an offset of zero is added. For the second 32 bit portion, an offset of four is added. For the 16-bit portion, an offset of eight is added. The FPU address generation protocol therefore includes two address generation steps. The first control vector calculates the address defined by the instruction. The second control vector adds the appropriate offset.

Branch instructions utilize the branch control vector protocol. Similar to the one operation protocol, no operation is generated for the first control vector, and the second control vector is the branch instruction operation. Similarly, a load-branch instruction protocol is defined for instructions for which the target of the branch is stored in memory. For example the RET instruction retrieves the target of the branch from the top of the stack. The first control vector causes an address generation for the load operation, and the second control vector performs the branch instruction operation.

Instructions which include the scale-index-base (SIB) byte are dispatched to two functional units. One of the functional units performs the addition of the base register value and the scaled index register value, utilizing the SIB control vector protocol. The first vector is not used, and the second vector causes the scaled addition to be performed. It is noted that the index register value may be scaled by zero, two, four, or eight.

The PUSH instructions utilizes the push control vector protocol. The push control vector protocol specifies that the first control vector is an address generation to generate the ESP value for use by the push instruction. This address is conveyed to load/store unit 26. The second control vector is used to convey the value to be pushed to load/store unit 26.

The POP instruction is dispatched to a pair of functional units 24 as well, according to one embodiment of microprocessor 10. One of the functional units employs the pop control vector protocol. The first control vector is not used. The second control vector performs an addition to generate the ESP value subsequent to the execution of the pop instruction.

Integer divide instructions utilize the divide control vector protocol. Integer division is performed by functional units 24A through an iterative non-restoring division algorithm. The divisor is subtracted from high order bits of the dividend. If the result is positive, then a binary one is shifted into the quotient. If the result is negative, then a binary zero is shifted into the quotient and the divisor is added back to the dividend. The dividend is then shifted by one bit such that the next iteration will subtract the divisor from lower order bits of the dividend. The first control vector of the divide protocol is the addition portion, and the second control vector is the subtraction portion of the division method. The vector chosen upon a particular iteration is dependent upon the positive or negative result of the prior iteration. In one embodiment, a bit is stored in the vector storage 110A–110C storing the divide instruction. The bit is indicative of a positive or negative result of the previous iteration, and is used to control the selection of multiplexor 130 instead of the selection control provided upon operation selection bus 84.

More details regarding the dispatch of instructions to a pair of functional units may be found in the commonly assigned, co-pending patent application entitled: "An Apparatus and Method for Aligning Variable Byte-Length Instructions to a Plurality of Issue Positions", Ser. No. 08/582,473, filed Jan. 2, 1996 by Narayan, et al. The disclosure of this patent application is incorporated herein by reference in its entirety.

According to one particular exemplary embodiment, vector storages 110 store the information shown in Tables 2 and 3 below. Table 2 includes information stored in shared vector storage 128. Table 3 includes information stored in first and second vector storages 124 and 126.

TABLE 2

Exemplary Control Bits, Shared Storage

| | |
|---|---|
| BMSEL | mux select for build mask |
| BTSEL | mux select takes constant offset for shift amount else use B operand for shifter amount; used in BTx opcodes |
| COND_CODES [3:0] | condition codes for flag generation |
| DIV | divide step indicator |
| FLAG_CLR | pass the EFLAGS through; overwrite with IFLG; and clear bits according to mask |
| FLAG_SET | pass the EFLAGS through; overwrite with IFLG; and set bits according to mask |
| FLGSEL [2:0] | flag generation input select (2: B operand, 1: ALU, 0: SHIFT) |
| FUAHBYTE | indication from functional unit to load/store unit that load data needs to be placed on bits 15:8 instead of 7:0 |
| MOVF | control bit for taking B operand and overwriting with IFLG |
| MOVRF | control bit for taking B operand and transferring appropriate bits to result flag |
| OPSZ [1:0] | data operand size sent to load/store unit along with logical address |
| PRED_AD_TAKEN | prediction address taken; used in flag generation |
| REP | repeat signal to flag generation |
| REPE | repeat or equal signal to flag generation |
| REPNE | repeat or not equal signal to flag generation |
| SCALE [3:0] | one hot encoded SIB scale |
| SEGLDHI | indicates to load/store unit that high side of shadow descriptor register needs to be loaded |
| SEGLDLO | indicates to load/store unit that low side of shadow descriptor register needs to be loaded |
| SEGSEL [3:0] | indicates to load/store unit which segment offset to use |
| SFTCFIN | shifter carry flag in used for SAR, RCL_1, and RCR_1 opcodes |
| SHFLEFT | shift left for ROL, RCL_1, SHL |
| SHFRIGHT | shift right |
| SHFROT | shift rotate for ROL, ROR, RCL_1, and RCR_1 opcodes |
| USESIB | use a scale version of B operand |

TABLE 3

Exemplary Control Bits, Separate Storage Per Vector

| | |
|---|---|
| ADD_F | generate the add style flag equation |
| AOPSEL [3:0] | one hot select for A operand |
| BOPSEL [3:0] | one hot select for B operand |
| BRN | signal indicating unconditional branch |
| BRNCC | signal indicating Jcc |
| BTX_F | generate the bit test style flag equations |
| CIN | carry in bit |

TABLE 3-continued

Exemplary Control Bits, Separate Storage Per Vector

| | |
|---|---|
| CMC_F | generate the complement carry style flag equations |
| FRESMUX [2:0] | encoded result bus mux select |
| GIN [2:0] | G (generate) bits for controlling ALU |
| LOG_F | use logical style flag generation |
| MOVCC | control bit for MOVCC opcode |
| MOVCC_EXC | control bit for MOVCC_EXC opcode; same as MOVCC but set exception on DSTAT if true |
| MOVCC_INT | control bit for MOVCC_INT opcode: same as MOVCC but sets sets software interrupt on DSTAT if true |
| MOVS_SEL | mux select for sending A operand to load/store unit |
| MUXCIN | mux select for using the carry flag or the operand steering supplied CIN for the ALU CIN |
| NEGATE | indication for ALU to negate the carry in bit |
| OPSIZE [2:0] | operand size (100: doubleword, 010: word, 001: byte) |
| PIN [3:0] | P (propagate) bits for controlling ALU |
| RSTATIN [2:0] | encoded status bus for load/store unit |
| SET_CC | SETcc opcode for flag generation; if condition codes and flags true, RES = 1; else = 0 |
| SIGNXA | sign extend A operand |
| SIGNXB | sign extend B operand |
| STAT [3:0] | control bit vector stored DSTAT |
| ZEROXA | zero extend the A operand |
| ZEROXB | zero extend the B operand |

It is noted that, although the above discussion occasionally focuses on the x86 microprocessor architecture, the present invention is not limited to use with this microprocessor architecture. Other microprocessor architectures which include instructions having complex instruction operations, or instructions which produce more than one result, may benefit from the present invention. The present invention may be particularly useful with complex operations which, through division into simpler operations, allow for less hardware (such as dataflow elements) to be included within functional units of the microprocessor. Furthermore, instructions which produce more than one result may add additional bussing between units to convey the additional results. By dividing the instruction into multiple instruction operations (each producing a single result), less bussing may be used between units.

In addition to providing for multiple control vectors per issue position, the multiple dispatch category is provided for additional flexibility in balancing the performance and complexity of microprocessor 10. An instruction may be categorized as multiple dispatch for a variety of reasons. For example, an instruction may specify a number of instruction operations greater than the number of control vectors provided per issue position in microprocessor 10. Such an instruction is dispatched to multiple issue positions to gain the number of control vectors employed by the instruction. Additionally, since each issue position is accorded one storage location in reorder buffer 32, one register result may be modified per issue position. Instructions which modify multiple registers use multiple issue positions to gain storage for the multiple register results. Table 4 below shows an exemplary set of multiple dispatch instructions from the x86 instruction set and the protocols employed in each dispatch position. For the exemplary set, multiple dispatch instructions are dispatched to two issue positions. Therefore, up to four control vectors are available to multiple dispatch instructions in the exemplary embodiment.

TABLE 4

Exemplary Multiple Dispatch Instructions and Related Protocols

| X86 Instruction | First Issue Position | Second Issue Position |
| --- | --- | --- |
| SIB w/load-op | SIB | load-op |
| SIB w/load-only | SIB | load-only |
| SIB w/op-store | SIB | op-store |
| SIB w/load-op-store | SIB | load-op-store |
| PUSH mem | load-only | push |
| CALL nr disp rel | push | branch |
| CALL nr reg indr | push | branch |
| CALL nr mem indr | push | load branch |
| POP reg | load-only | pop |
| RET | load branch | pop |
| LEAVE | one operation | load-op |
| LOOP | one operation | branch |
| JCXZ | one operation | branch |
| SCAS | load-op | one operation |

Figure 7:
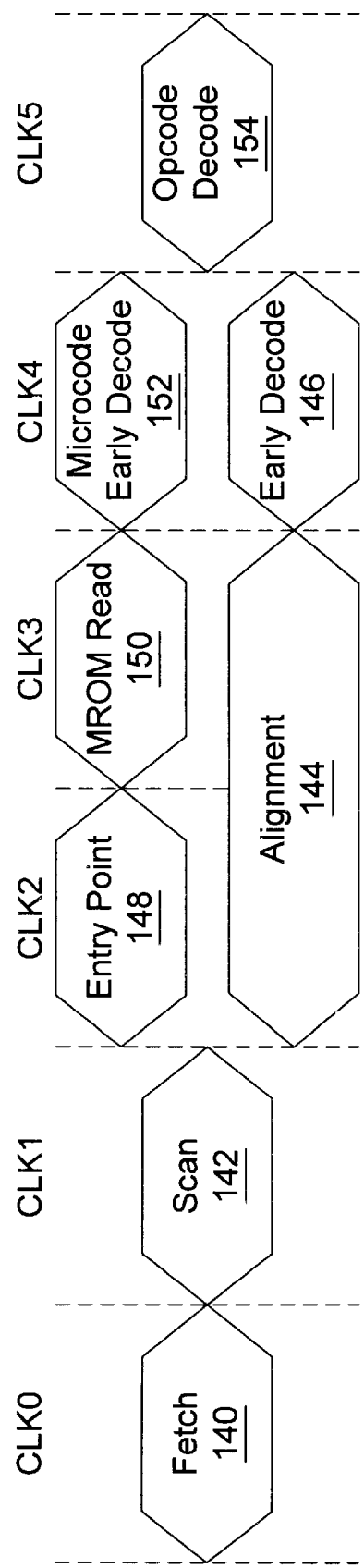
FIG. 7 is a timing diagram of one embodiment of the microprocessor shown in FIG. 1.

Turning now to FIG. 7, a timing diagram depicting instruction flow through microprocessor 10 according to one embodiment of microprocessor 10 is shown. Clock cycles are delimited by vertical dashed lines, and are labeled CLK0 through CLK5. During clock cycle CLK0, an instruction block 10 is fetched from instruction cache 16 (block 140). The instruction block is conveyed to instruction scanning unit 52, which scans the predecode data associated with the instructions (block 142). Microcode instructions are routed to MROM unit 34, and fast path (or single dispatch) instructions are routed to instruction alignment unit 18. Instruction alignment unit 18 aligns instructions to decode units 20 during clock cycles CLK2 and CLK3 (block 144). During CLK2, instructions are aligned into preliminary issue positions. During CLK3, instructions are assembled into final issue positions for conveyance to decode units 20. Early decode units 40 perform early decode during clock cycle CLK4 (block 146).

MROM unit 34 employs a three stage pipeline in the embodiment depicted in FIG. 7. During CLK2, a microcode instruction is decoded to determine an entry point into a read-only memory (ROM) employed within MROM unit 34 (block 148) The read-only memory stores microcode routines comprising single dispatch instructions which emulate the operation of the microcode instruction. The entry point is an address within the ROM which stores the first instruction the routine corresponding to the particular microcode instruction. It is noted that the single dispatch instruction category comprises x86 instructions, and may further comprise non-x86 instructions extensions defined for microprocessor 10. Instruction extensions may be defined when an instruction operation is needed which does not correspond to one of the x86 single dispatch instructions.

Once the entry point has been generated, MROM unit 34 reads the ROM at the entry point address (clock cycle CLK3, block 150). The instructions read are decoded in a microcode early decode unit similar to early decode units 40 (block 152). If more instructions are needed to complete the routine, additional ROM reads and early decodes are performed for the additional instructions.

During clock cycle CLK5, the instructions dispatched by instruction scanning unit 52 during clock cycle CLK1 arrive in opcode decode units 44 (block 154). As FIG. 7 illustrates for the present embodiment, instructions flow through the pipeline of MROM unit 34 and the pipeline of instruction alignment unit 18/decode units 20 in the same number of clock cycles. Therefore, multiple dispatch instructions may be routed to MROM unit 34, similar to microcode instructions. The multiple dispatch instructions then flow through the MROM pipeline. If a single dispatch instruction is dispatched concurrently, the single dispatch instruction will arrive at opcode decode units 40 concurrently with the multiple dispatch instruction. In other embodiments, the pipeline of MROM unit 34 may require more clock cycles than the pipeline for single dispatch instructions. In such an embodiment, multiple dispatch instructions may benefit from flowing through the single dispatch instruction pipeline.

Figure 8:
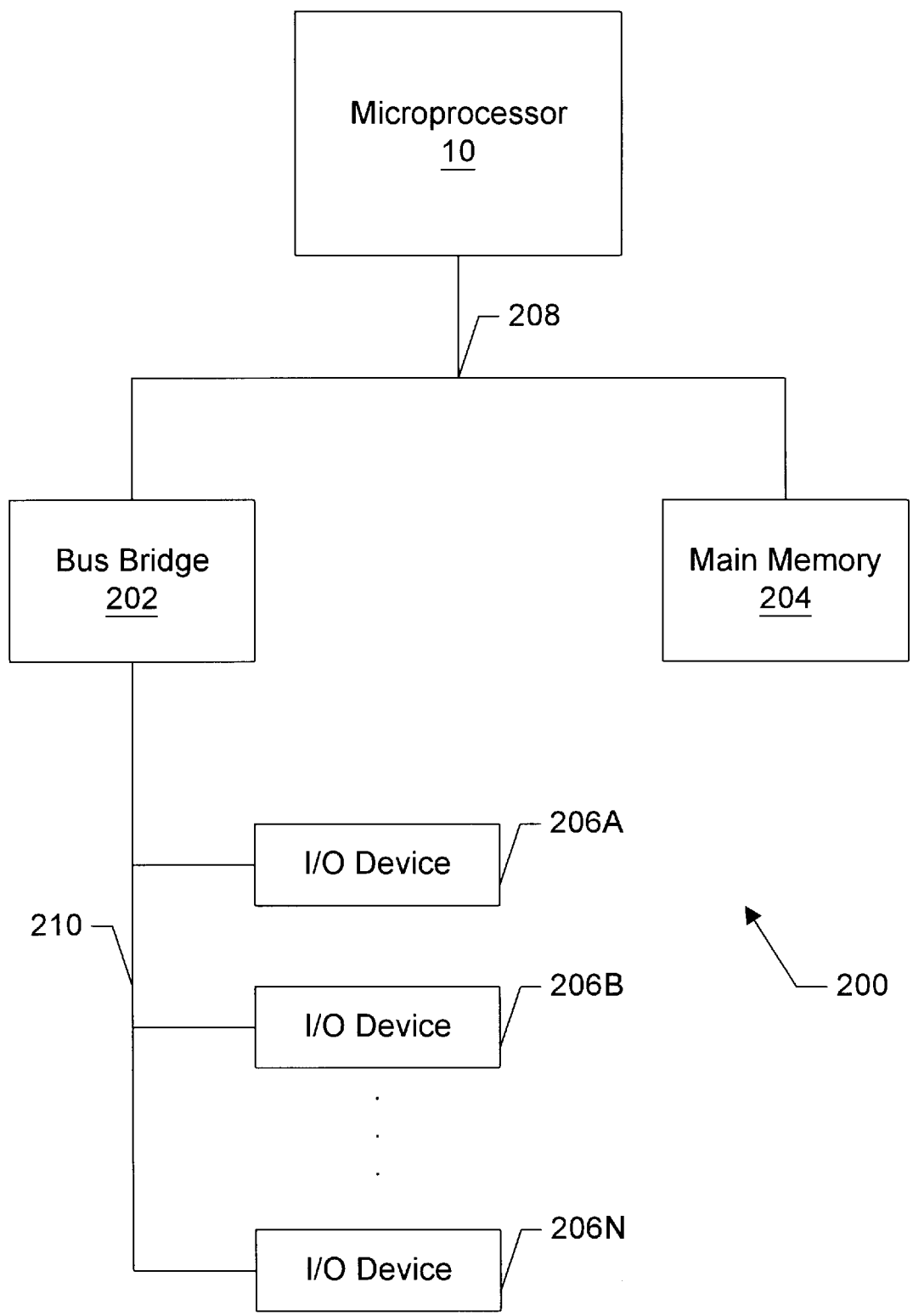
FIG. 8 is a block diagram of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound cards etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 5 below indicates single dispatch, multiple dispatch, and microcode instructions for one embodiment of microprocessor 10 employing the x86 instruction set:

TABLE 5 x86 Single Dispatch, Multiple Dispatch, and Microcode Instructions

| X86 Instruction | Instruction Category |
|---|---|
| AAA | microcode |
| AAD | microcode |
| AAM | microcode |
| AAS | microcode |
| ADC | single dispatch |
| ADD | single dispatch |
| AND | single dispatch |
| ARPL | microcode |
| BOUND | microcode |
| BSF | single dispatch |
| BSR | single dispatch |
| BSWAP | microcode |
| BT | single dispatch |
| BTC | single dispatch |
| BTR | single dispatch |
| BTS | single dispatch |
| CALL | single dispatch/multiple dispatch |
| CBW | single dispatch |
| CWDE | single dispatch |
| CLC | single dispatch |
| CLD | single dispatch |
| CLI | microcode |
| CLTS | microcode |
| CMC | single dispatch |
| CMP | single dispatch |
| CMPS | microcode |
| CMPSB | microcode |
| CMPSW | microcode |
| CMPSD | microcode |
| CMPXCHG | microcode |
| CMPXCHG8B | microcode |
| CPUID | microcode |
| CWD | microcode |
| CWQ | microcode |
| DDA | microcode |
| DAS | microcode |
| DEC | single dispatch |
| DIV | microcode |
| ENTER | microcode |
| HLT | microcode |
| IDIV | microcode |
| IMUL | multiple dispatch |
| IN | microcode |
| INC | single dispatch |
| INS | microcode |
| INSB | microcode |
| INSW | microcode |
| INSD | microcode |
| INT | microcode |
| INTO | microcode |
| INVD | microcode |
| INVLPG | microcode |
| IRET | microcode |
| IRETD | microcode |
| Jcc | single dispatch |
| JCXZ | multiple dispatch |
| JECXZ | multiple dispatch |
| JMP | single dispatch |
| LAHF | single dispatch |
| LAR | microcode |
| LDS | microcode |

TABLE 5-continued x86 Single Dispatch, Multiple Dispatch, and Microcode Instructions

| X86 Instruction | Instruction Category |
|---|---|
| LES | microcode |
| LFS | microcode |
| LGS | microcode |
| LSS | microcode |
| LEA | single dispatch |
| LEAVE | multiple dispatch |
| LGDT | microcode |
| LIDT | microcode |
| LLDT | microcode |
| LMSW | microcode |
| LODS | microcode |
| LODSB | microcode |
| LODSW | microcode |
| LODSD | microcode |
| LOOP | multiple dispatch |
| LOOPcond | microcode |
| LSL | microcode |
| LTR | microcode |
| MOV | single dispatch |
| MOVCC | single dispatch |
| MOV.CR | microcode |
| MOV.DR | microcode |
| MOVS | microcode |
| MOVSB | microcode |
| MOVSW | microcode |
| MOVSD | microcode |
| MOVSX | single dispatch |
| MOVZX | single dispatch |
| MUL | multiple dispatch |
| NEG | single dispatch |
| NOP | single dispatch |
| NOT | single dispatch |
| OR | single dispatch |
| OUT | microcode |
| OUTS | microcode |
| OUTSB | microcode |
| OUTSW | microcode |
| OUTSD | microcode |
| POP | multiple dispatch |
| POPA | microcode |
| POPAD | microcode |
| POPF | microcode |
| POPFD | microcode |
| PUSH | single dispatch/multiple dispatch |
| PUSHA | microcode |
| PUSHAD | microcode |
| PUSHF | single dispatch |
| PUSHFD | single dispatch |
| RCL | microcode |
| RCR | microcode |
| ROL | single dispatch |
| ROR | single dispatch |
| RDMSR | microcode |
| REP | microcode |
| REPE | microcode |
| REPZ | microcode |
| REPNE | microcode |
| REPNZ | microcode |
| RET | multiple dispatch |
| RSM | microcode |
| SAHF | single dispatch |
| SAL | single dispatch |
| SAR | single dispatch |
| SHL | single dispatch |
| SHR | single dispatch |
| SBB | single dispatch |
| SCAS | multiple dispatch |
| SCASB | microcode |
| SCASW | microcode |
| SCASD | microcode |
| SETcc | single dispatch |
| SGDT | microcode |
| SIDT | microcode |
| SHLD | microcode |
| SHRD | microcode |

TABLE 5-continued x86 Single Dispatch, Multiple Dispatch, and Microcode Instructions

| X86 Instruction | Instruction Category |
|---|---|
| SLDT | microcode |
| SMSW | microcode |
| STC | single dispatch |
| STD | single dispatch |
| STI | microcode |
| STOS | microcode |
| STOSB | microcode |
| STOSW | microcode |
| STOSD | microcode |
| STR | microcode |
| SUB | single dispatch |
| TEST | single dispatch |
| VERR | microcode |
| VERW | microcode |
| WBINVD | microcode |
| WRMSR | microcode |
| XADD | microcode |
| XCHG | microcode |
| XLAT | single dispatch |
| XLATB | single dispatch |
| XOR | single dispatch |

Note: Instructions including an SIB byte are also considered multiple dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", a Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit ", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Narayan, et al. The disclosure of these patent applications are incorporated herein by reference in their entirety.

In accordance with the above disclosure, an apparatus for efficient instruction execution has been disclosed. The apparatus provides multiple control vectors in each issue position, allowing an instruction routed to the issue position to perform multiple instruction operations from that issue position. Additionally, certain instructions may be routed to multiple dispatch positions, such that multiple sets of control vectors may be employed to perform the required instruction operations. Finally, the most complex instructions are routed to a microcode unit for decomposition into a plurality of instructions. The instructions are dispatched to the issue positions, using several consecutive clock cycles if necessary. Advantageously, instructions may be classified into the most efficient category consistent with the allowable complexity in the issue positions. The three levels of categorization allow a flexible scheme for optimizing between complexity and performance. A high level of performance may be achieved while minimizing the complexity of the issue positions.

Numerous variations and modifications will become apparent to those skilled in the art once the above disclosure is fully appreciated. It is intended that the following claims be interpreted to embrace all such variations and modifications.

What is claimed is:

1. A method for efficient instruction execution in a microprocessor, comprising:

classifying an instruction into one of at least three categories, said categories include a single dispatch category, a multiple dispatch category, and a microcode instruction category;

routing said instruction to a single issue position if said instruction is in said single dispatch category, said issue position allocating a plurality of control vectors to said instruction, wherein each of said plurality of control vectors is separately executed within said issue position;

routing said instruction to at least two issue positions if said instruction is in said multiple dispatch category, each said issue position allocating said plurality of control vectors to a portion of said instruction; and routing said instruction to a microcode unit if said instruction is in said microcode instruction category, said microcode unit configured to decompose said instruction into a plurality of instructions within said single dispatch category, said plurality of instructions performing a plurality of operations corresponding to said instruction.

2. The method as recited in claim 1 wherein each said issue position comprises a reservation station coupled to a functional unit.

3. The method as recited in claim 2 wherein said reservation station is configured to store operands of said instruction until each operand of said instruction is provided.

4. The method as recited in claim 2 wherein said functional unit is configured to store said plurality of control vectors corresponding to said instruction.

5. The method as recited in claim 1, wherein one or more of said plurality of control vectors are not used for said instruction, and wherein said one or more of said plurality of control vectors are not executed.

6. The method as recited in claim 1 wherein said instruction is routed to said at least two issue positions through said microcode unit if said instruction is in said multiple dispatch category.

7. The method as recited in claim 1 wherein said instruction is routed to a predetermined fixed number of issue positions if said instruction is in said multiple dispatch category.

8. The method as recited in claim 7 wherein said predetermined fixed number is two.

9. The method as recited in claim 7 wherein said plurality of control vectors allocated by each of said predetermined fixed number of issue positions is a second predetermined fixed number.

10. The method as recited in claim 9 wherein said second predetermined fixed number is two.

11. The method as recited in claim 9 wherein said plurality of control vectors within a first of said predetermined fixed number of issue positions comprise different control vectors from said plurality of control vectors within a second of said predetermined fixed number of issue positions.

12. An apparatus for efficient instruction execution, comprising:
- a first issue position including a first reservation station coupled to a first functional unit;
- a second issue position including a second reservation station coupled to a second functional unit;
- a microcode unit configured to decompose an instruction into a plurality of instructions executable by said first issue position and said second issue position, wherein said instruction is in a microcode instruction category if said plurality of instructions is different in number than a predetermined fixed number of instructions; and
- an instruction scanning unit coupled to said microcode unit and coupled to provide instructions to said first issue position and said second issue position, wherein said instruction scanning unit is configured to categorize said instruction into one of a single dispatch category, a multiple dispatch category, and said microcode instruction category, and wherein said instruction scanning unit is configured to route said instruction to said microcode unit if said instruction is in said microcode instruction category, and wherein said instruction scanning unit is configured to route said instruction to one of said first issue position and said second issue position if said instruction is in said single dispatch category, and wherein said instruction is in said multiple dispatch category if said plurality of instructions equals said predetermined fixed number of instructions;
- wherein said first issue position and said second issue position are each configured to execute a particular instruction by allocating a plurality of control vectors to said particular instruction and by separately executing each one of said plurality of control vectors therein.

13. The apparatus as recited in claim 12 wherein said instruction scanning unit is configured to route said instruction to said microcode unit if said instruction is in said multiple dispatch category.

14. The apparatus as recited in claim 12 wherein said instruction scanning unit is configured to route said instruction to said first issue position and said second issue position if said instruction is in said multiple dispatch category.

15. The apparatus as recited in claim 14 wherein said first issue position is configured to execute a first portion of said instruction via a first plurality of control vectors, and wherein said second issue position is configured to execute a second portion of said instruction via a second plurality of control vectors.

16. The apparatus as recited in claim 12, wherein one or more of said plurality of control vectors are not used for said particular instruction, and wherein said one or more of said plurality of control vectors are not executed.

17. The microprocessor as recited in claim 16, wherein one or more of said plurality of control vectors are not used for said particular instruction, and wherein said one or more of said plurality of control vectors are not executed.

18. The apparatus as recited in claim 15 wherein said first plurality of control vectors differ from said second plurality of control vectors.

19. A microprocessor, comprising:
- a first issue position including a first decode unit coupled to a first reservation station, said first reservation station further coupled to a first functional unit within said first issue position;
- a second issue position including a second decode unit coupled to a second reservation station, said second reservation station further coupled to a second functional unit within said second issue position;
- an instruction alignment unit configured to align instructions to said first issue position and said second issue position, said instruction alignment unit coupled to said first issue position and said second issue position;
- a microcode unit configured to decompose an instruction into a plurality of instructions executable by said first issue position and said second issue position, wherein said instruction is in a microcode instruction category if said plurality of instructions is different in number than a predetermined fixed number of instructions; and
- an instruction scanning unit coupled to said microcode unit and to said instruction alignment unit, wherein said instruction scanning unit is configured to categorize said instruction as in one of a single dispatch category, a multiple dispatch category, and said microcode instruction category, and wherein said instruction scanning unit is configured to route said instruction to said microcode unit if said instruction is in said microcode instruction category, and wherein said instruction scanning unit is configured to route said instruction to said instruction alignment unit for alignment to one of said first issue position and said second issue position if said instruction is in said single dispatch category, and wherein said instruction is in said multiple dispatch category if said plurality of instructions equals said predetermined fixed number of instructions;
- wherein said first issue position and said second issue position are each configured to execute a particular instruction by allocating a plurality of control vectors to said particular instruction and by separately executing each one of said plurality of control vectors therein.

20. The microprocessor as recited in claim 19 wherein said instruction scanning unit is configured to route said instruction to said microcode unit if said instruction is in said multiple dispatch category.

21. The microprocessor as recited in claim 19 wherein said instruction scanning unit is configured to route said instruction to said instruction alignment unit if said instruction is in said multiple dispatch category.

22. The method as recited in claim 1 further comprising:
- routing a first instruction classified in said single dispatch category to said single issue position; and
- concurrently routing a second instruction classified in said multiple dispatch category to said at least two issue positions.

* * * * *